United States Patent [19]

Mercer

[11] 4,355,128

[45] Oct. 19, 1982

[54] DURABLE MOLDED ARTICLES

[75] Inventor: James B. Mercer, Henderson, N.C.

[73] Assignee: Facet Enterprises, Inc., Henderson, N.C.

[21] Appl. No.: 263,988

[22] Filed: May 15, 1981

[51] Int. Cl.$^3$ .............................................. C08L 61/24
[52] U.S. Cl. ................... 524/423; 524/494; 524/512; 524/539; 524/541
[58] Field of Search ................. 524/423, 512

[56] References Cited

U.S. PATENT DOCUMENTS

| | | | |
|---|---|---|---|
| 2,966,473 | 12/1960 | Biefeld et al. | 524/423 |
| 3,786,041 | 1/1974 | Talsma | 260/17.3 |
| 3,878,142 | 4/1975 | Tisza | 260/17.2 |
| 3,975,320 | 8/1976 | Lane et al. | 524/423 |
| 4,085,246 | 4/1978 | Buser et al. | 428/220 |
| 4,159,301 | 6/1979 | Buser et al. | 264/331 |

Primary Examiner—Lewis T. Jacobs

[57] ABSTRACT

Economical durable molded articles are prepared by mixing a hardenable resin system, gypsum filler and glass fibers, molding the desired article from the mixture, and hardening the molded article by heat or by the use of a hardening agent. The resin system comprises at least one hardenable resin, for example urea formaldehyde resin, and can include a second hardenable resin, for example polyvinyl acetate resin. The gypsum filler may be an economical by-product of phosphate refining. The glass fibers may be an economical by-product from the manufacture of bulk filter media. The constituents of the resin system and their proportions are chosen to impart desired surface finishes to the molded article. Coloring agents and other additives may also be added to affect the surface finish and appearance.

28 Claims, 1 Drawing Figure

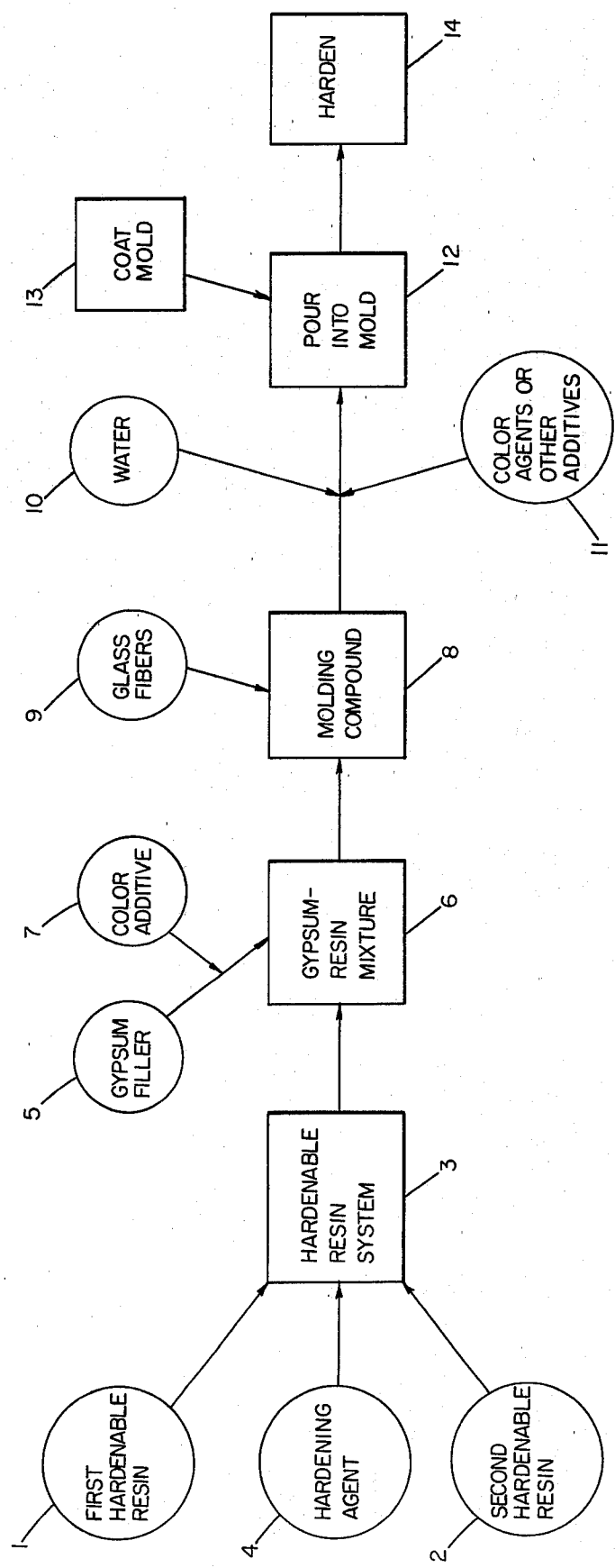

DURABLE MOLDED ARTICLES

BACKGROUND OF THE INVENTION

This invention relates to molding durable articles.

Articles are frequently molded by mixing a hardenable resin system with a filler to form a molding compound, molding the desired article from the compound, and hardening the article.

SUMMARY OF THE INVENTION

The invention features a highly durable molded article comprising a hardened mixture of a hardenable resin system, gypsum filler which is a by-product of phosphate refining, and glass fibers which are a by-product of bulk filter media production. By using as filler two products which heretofore have been regarded by industry as unusable waste products which are not only worthless, but costly to dispose of, the invention provides substantial economic advantages.

In preferred embodiments, the molding compound comprises between about 25% and about 90% by weight of the resin system, between about 3% and about 60% by weight of the gypsum filler and between about 1% and about 15% by weight of the glass fibers. The resin system can either include one hardenable resin, preferably urea formaldehyde, or phenolic-resin, or can include between about 20% and about 95% by weight of a first hardenable resin and between about 5% and about 80% by weight of at least a second hardenable resin. At least one of the hardenable resins is either heat hardenable or hardenable without heat by the addition of a hardening agent. In preferred embodiments, the first hardenable resin is urea formaldehyde (UF) and the second hardenable resin is polyvinyl acetate resin.

In other embodiments, the second hardenable resin can be, for example, acrylic emulsion, polyvinyl acetate emulsion, vinyl acrylic copolymer, polyester resin, phenolic resin, or styrene butadiene latex.

According to the method of making the molded articles of the invention, a hardenable resin system is first prepared, the gypsum filler and glass fibres are mixed in, and the molding compound is poured into a mold and then hardened. Hardening is preferably accomplished by heating to a temperature of between about 240° F. and about 350° F. for about 3 to 5 hours. The molding compound can be diluted with water prior to molding, and can also include coloring agents and other additives which affect the finished article's surface finish and appearance.

DESCRIPTION OF THE PREFERRED EMBODIMENTS

We turn now to a description of the preferred embodiments of the invention, after first briefly describing the drawing.

Drawing

The FIGURE is a flow-diagram of a preferred method of preparing durable molded articles.

DESCRIPTION OF PREFERRED EMBODIMENTS

Referring to the drawing, hardenable resin system 3 includes a first hardenable resin 1, which can be any resin hardenable by heat or by the addition of hardening agent 4. Resin 1 is most preferably UF or a phenolic resin. A typical commercially available UF resin, in aqueous solution, has a viscosity at 25° C. of 700 to 1400 Cps, a specific gravity at 25° C. of 1.290–1.310, and a pH of 7.4–7.7. (An example of a suitable UF resin is Plyamine R 21-004, available from Reichhold Chemicals, Inc., RCI Building, White Plains, N.Y. 10603).

In preferred embodiments, the second component of resin system 3 includes at least one other hardenable resin 2, which can also be any resin hardenable by heat or by the addition of a hardening agent. Second resin 2 is most preferably polyvinyl acetate resin.

The hardenable resins and their respective proportions are selected to impart desired surface finishes and appearances to the finished article.

Gypsum filler 5 comprises gypsum, water, and a small amount of phosphate. Typically, gypsum filler comprises, by weight, between about 75% and 95% gypsum, between about 10% and 20% water, and between about 0.2% and 1% phosphate. A suitable gypsum filler is produced by Texasgulf, and typically contains, by weight, about 85.4% gypsum, abut 14% water, and about 0.6% $P_2O_5$, and has a pH of about 2.9.

Glass fibres 9 are an economical by-product of bulk filter media manufacturing. Suitable fibres are produced by the Bassichis Company, 2323 W. Third St., Cleveland, Ohio 44130. Such fibres are frequently coated with UF from the bulk filter media manufacturing process. This coating can be removed or not, as desired. The glass fibres also are provided in a variety of lengths. To be used in the present invention, fibres longer than about 2 inches should be shortened, so that the majority of the fibres are between about ¼ inch and 2 inches long, preferably between about ½ inch and 1½ inches long.

Hardenable resin system 3 is prepared by blending the first hardenable resin 1 with the second hardenable resin 2. Either hardenable resin may be diluted with water before the resin system is mixed. The hardening agent 4, if used, is then added. The gypsum-resin mixture 6 is prepared by blending the gypsum filler 5 into the hardenable resin system 3. Any conventional coloring agent 7 can, if desired, be mixed into the gypsum filler before the gypsum-resin mixture is prepared. Glass fibers 9 are then mixed into the gypsum-resin mixture to form the molding compound 8. Water 10 can be added to dilute the molding compound to facilitate pouring, and coloring agents and any other desired additives 11 can be added at this stage to affect the surface finish and appearance of the finished article.

The finish of the article may also be improved by coating (13) the mold surface with a mixture of a hardenable resin and a hardening agent. For example, a mixture of polyester gel coat and methyl ethyl ketone (a hardening agent) can be sprayed on the mold surface and allowed to harden before filling the mold.

Molding compound 8 is then poured (12) into the mold and is hardened (14) either by the action of the hardening agent or the application of heat. When heat is used, the molding compound is preferably heated to a temperature of between about 240° F. and about 350° F. for about 3 to 5 hours.

The following specific examples are intended to more particularly point out the invention, without acting as limitations upon its scope.

EXAMPLE 1

120 grams of UF resin were mixed with 360 grams of polyvinyl acetate homopolymer resin and 60 grams of Texasgulf gypsum filler (85.4% gypsum, 14% water, 0.6% P₂O₅) were mixed into the resin system. 15 grams of ¼" to 1½" long glass fibers, which were a by-product of the manufacturing of bulk filter media and which were coated with UF, were then added and mixed in. The resulting compound was molded and heat hardened.

EXAMPLE 2

120 grams of UF resin were mixed with 180 grams of polyvinyl acetate resin and 30 grams of gypsum filler, as in example 1, were then mixed into the resin system. Ten grams of glass fibers, as in example 1, were then added and mixed in and the resulting compound molded and heat hardened.

EXAMPLE 3

525 grams of UF resin were mixed with 1575 grams of polyvinyl acetate resin and 160 grams of gypsum filler, as in Example 1, were then mixed into the resin system. 150 grams of glass fibers were then added and mixed in and the resulting compound molded and heat hardened.

EXAMPLE 4

226 grams of UF resin were mixed with 226 grams of polyvinyl acetate resin and 904 grams of gypsum filler, as in Example 1, were then mixed into the resin system. 200 grams of glass fibers, as in Example 1, were then added and mixed in and the resulting compound diluted with 28 oz. of water, then molded and heat hardened.

EXAMPLE 5

460 grams of UF resin were mixed with 120 grams of polyvinyl acetate resin and 300 grams of gypsum filler, as in Example 1, were then mixed into the resin system. 100 grams of glass fibers, as in Example 1, were then added and mixed in and the resulting compound diluted with 7 oz. of water, then molded into a brick and heat hardened at about 275° F. for about 5 hours.

EXAMPLE 6

690 grams of UF resin were mixed with 180 grams of polyvinyl acetate resin and 450 grams of gypsum filler, as in Example 1, were then mixed into the resin system. 150 grams of glass fibers, as in Example 1, were then added and mixed in. The resulting compound was diluted with 10½ oz. water, then molded and heat hardened.

EXAMPLE 7

420 grams of UF resin were mixed with 1260 grams of polyvinyl acetate resin and 80 grams of gypsum filler, as in Example 1, were then mixed into the resin system. 120 grams of glass fibers, as in Example 1, were then added and mixed in and the resulting compound molded and heat hardened.

EXAMPLE 8

690 grams of UF resin were mixed with 180 grams of polyvinyl acetate resin and 450 grams of gypsum filler, as in EXAMPLE 1, were then mixed into the resin system. 150 grams of glass fibers, as in Example 1, were then added and mixed in and the resulting compound diluted with 12¼ oz. of water, then molded and heat hardened.

EXAMPLE 9

460 grams of UF resin were mixed with 120 grams of acrylic resin and 300 grams of gypsum filler, as in Example 1, were then mixed into the resin system. 100 grams of glass fibers, as in Example 1, were then added and mixed in and the resulting compound diluted with 7 oz. of water, then molded into a brick and heat hardened.

EXAMPLE 10

690 grams of UF resin were mixed with 180 grams of polyvinyl acetate resin and 450 grams of gypsum filler, as in Example 1, were then mixed into the resin system. 150 grams of glass fibers, as in Example 1, were then added and mixed in and the resulting compound diluted with 12¼ oz. of water, then molded and heat hardened.

EXAMPLE 11

226 grams of UF resin were mixed with 226 grams of polyvinyl acetate resin and 904 grams of gypsum filler, as in Example 1, were then mixed into the resin system. 200 grams of glass fibers, as in Example 1, were then added and mixed in and the resulting compound diluted with 24½ oz. of water, then molded and heat hardened.

EXAMPLE 12

765 grams of UF resin were mixed with 130 grams of polyvinyl acetate resin and 940 grams of gypsum filler, as in Example 1, were then mixed into the resin system. 150 grams of glass fibers, as in Example 1, were then added and mixed in and the resulting compound diluted with 17½ oz. water, then molded and heat hardened.

EXAMPLE 13

890 grams of UF resin were mixed with 180 grams of polyvinyl acetate resin and 450 grams of gypsum filler, as in Example 1, were then mixed into the resin system. 150 grams of glass fibers, as in Example 1, were then added and mixed in and the resulting compound molded into an ashtray and heat hardened.

EXAMPLE 14

660 grams of UF resin were mixed with 120 grams of #97-527 vinyl acrylic emulsion (Reichhold Chemicals, Inc.) and 300 grams of gypsum filler, as in Example 1, were then mixed into the resin system. 100 grams of glass fibers, as in Example 1, were then added and mixed in, and the resulting compound molded into a brick and hardened by heating for between about 4 hours and about 5 hours at about 275° F.

EXAMPLE 15

1000 grams of UF resin were mixed with 180 grams of polyvinyl acetate resin, and 450 grams of gypsum filler, as in Example 1, were then mixed into the resin system. 150 grams of glass fibers, as in Example 1, were then added and mixed in and the resulting compound molded and heat hardened.

EXAMPLE 16

660 grams of UF resin were mixed with 120 grams of #97-499 vinyl acrylic emulsion (Reichhold Chemicals, Inc.) and 300 grams of gypsum filler, as in Example 1, were then mixed into the resin system. 100 grams of glass fiber, as in example 1, were then added and mixed in and the resulting compound molded into a brick and heat hardened.

EXAMPLE 17

690 grams of UF resin were mixed with 180 grams of polyvinyl acetate resin and 450 grams of gypsum fiber, as in Example 1, colored with 30 grams of Hilton Davis water-base blue dye, were then mixed into the resin system. 100 grams of glass fibers, as in Example 1, were then added and mixed in and the resulting compound diluted with 7 oz. of water, then molded into an ash tray and heat hardened at about 250° F. for about 3 hours.

EXAMPLE 18

660 grams of UF resin were mixed with 120 grams of #90-808 acrylic resin (Reichhold Chemicals, Inc.) and 300 grams of gypsum filler, as in Example 1, were then mixed into the resin system. 100 grams of glass fibers, as in Example 1, were then added and mixed in and the resulting compound molded into a brick and heat hardened.

EXAMPLE 19

850 grams of UF resin were mixed with 180 grams of #97-499 vinyl acrylic emulsion (Reichhold Chemicals, Inc.) and 450 grams of gypsum filler, as in Example 1, were then mixed into the resin system. 100 grams of glass fibers, as in Example 1, were then added and mixed in and the resulting compound molded into an ashtray and heat hardened.

EXAMPLE 20

850 grams of UF resin were mixed with 180 grams of #97-499 vinyl acrylic emulsion (Reichhold Chemicals, Inc.) and 450 grams of gypsum filler, as in Example 1, were then mixed into the resin system. 100 grams of glass fibers, as in Example 1, were then added and mixed in and the resulting compound molded into an ashtray and heat hardened.

EXAMPLE 21

840 grams phenolic resin (Southeastern Adhesives Corp. 333-B) and 42 grams of phenolic catalyst (Southeastern Adhesives Corp. 333-C) were mixed together and 300 grams of gypsum filler, as in Example 1, were then mixed into the resin system. 100 grams of glass fibers, as in Example 1, were then added and mixed in and the resulting compound molded into a brick and heat hardened at about 250° F. for about 4 hours.

EXAMPLE 22

900 grams of UF resin were mixed with 180 grams of #97-499 vinyl acrylic emulsion (Reichhold Chemicals, Inc.) and 600 grams of gypsum filler, as in Example 1, were then mixed into the resin system. 80 grams of glass fibers, as in Example 1, were then added and mixed in and the resulting compound molded into an ashtray and heat hardened.

EXAMPLE 23

1000 grams of UF resin were mixed with 180 grams of #97-499 vinyl acrylic emulsion (Reichhold Chemicals, Inc.) and 465 grams of gypsum filler, as in Example 1, were then mixed into the resin system. 80 grams of glass fibers, as in Example 1, were then added and mixed in and 235 grams of silicate (IMSIL A-108) were added to the resulting compound, which was then molded into an ashtray and heat hardened.

EXAMPLE 24

800 grams of UF resin (Southeastern Adhesives Corp. 333A) were mixed with 200 grams of #97-499 vinyl acrylic emulsion and 600 grams of gypsum filler, as in Example 1, were then mixed into the resin system. 80 grams of glass fibers, as in Example 1, were then added and mixed in and the resulting compound molded into an ashtray and heat hardened.

EXAMPLE 25

600 grams of UF resin were mixed with 200 grams of polyvinyl acetate resin (Southeastern Adhesives Corp. 265-5) and 600 grams of gypsum filler, as in Example 1, were then mixed into the resin system. 100 grams of glass fibers, as in Example 1, were then added and mixed in and the resulting compound molded and heat hardened.

EXAMPLE 26

800 grams of UF resin (Southeastern Adhesives Corp. 333-A) were mixed with 200 grams of acrylic resin (Taylor Chemical Corporation) and 600 grams of gypsum filler, as in Example 1, were then mixed into the resin system. 80 grams of glass fibers, as in Example 1, were then added and mixed in and the resulting compound molded and heat hardened.

EXAMPLE 27

600 grams of UF resin (Borden Chemicals, Inc.) were mixed with 50 grams of polyvinyl acetate (Reichhold Chemicals, Inc.) and 600 grams of gypsum filler, as in Example 1, were mixed into the resin system. 75 grams of glass fibers, as in Example 1, were then added and mixed in and the resulting compound diluted with 14 oz. of hot water and colored with yellow dye, then molded in a 3" channel and heat hardened.

EXAMPLE 28

800 grams of UF resin (Borden Chemicals, Inc.), diluted with 200 grams of water, were mixed with 200 grams of acrylic emulsion (Taylor Chemical Corp.) and 900 grams of gypsum filler, as in Example 1, were then mixed into the resin system. 50 grams of glass fibers, as in Example 1, were then added and mixed in and the resulting compound molded in a 3" channel and heat hardened.

EXAMPLE 29

1000 grams of UF resin (Borden Chemicals, Inc.) were mixed with 250 grams of #40-350 Plyamul resin (Reichhold Chemicals, Inc.) and 900 grams of gypsum filler, as in Example 1, were then mixed into the resin system. 100 grams of glass fibers, as in Example 1, were then added and mixed in and the resulting compound molded in a large dish and heat hardened.

EXAMPLE 30

667 grams of UF resin (Borden Chemicals, Inc.), diluted with 333 grams of water, were mixed with 200 grams of 90-608 vinyl acrylic resin (Reichhold Chemicals, Inc.) and 800 grams of gypsum filler, as in Example 1, were then mixed into the resin system. 100 grams of glass fibers, as in Example 1, were then added and mixed in and the resulting compound molded in a 3" channel, which had been gel coated and powdered with gypsum, and heat hardened.

EXAMPLE 31

800 grams of UF resin (Borden Chemicals, Inc.) were mixed with 200 grams of 97-499 vinyl acrylic emulsion (Reichhold Chemicals, Inc.) and 600 grams of gypsum filler, as in Example 1, were then mixed into the resin system. 80 grams of glass fibers, as in Example 1, were then added and mixed in and the resulting compound poured into a mold which had been sprayed coated with a mixture of 400 grams of polyester gel coat and 4 grams of M.E.K. curing agent. The molded article was heat hardened at about 300° F. for about 4 hours.

EXAMPLE 32

600 grams of UF resin (Borden Chemicals, Inc.) were mixed with 1600 grams of #405 powder melamine resin (Bakelite Thermoset Ltd. of Ohio, Inc.) and 600 grams of gypsum filler, as in Example 1, were then mixed into the resin system. 50 grams of glass fibers, as in Example 1, were then added and mixed in and the resulting compound diluted with 7 oz. of hot water, then molded and heat hardened. The hardening produced a ⅛" shrinkage of the finished article.

EXAMPLE 33

28 oz. of UF resin were mixed with 140 grams of 9001 powdered phenolic (Bakelite Thermoset Ltd. of Ohio, Inc.) and 28 oz. of gypsum filler, as in Example 1, were then mixed into the resin system. 50 grams of glass fibers, as in Example 1, were then added and mixed in and the resulting compound molded and heat hardened. Shrinkage of the finished article occurred.

EXAMPLE 34

800 grams of UF resin (Borden Chemicals, Inc.) were mixed with 400 grams of 97-499 vinyl acrylic emulsion (Reichhold Chemicals, Inc.) and 400 grams of gypsum filler, as in Example 1, were then mixed into the resin system. 70 grams of glass fibers, as in Example 1 were then added and blended in with a hard electric mixer, 400 grams of sand were then added to the resulting compound, which was molded and heat hardened. Shrinkage of the finished article occurred.

EXAMPLE 35

600 grams of UF resin were mixed with 200 grams of 97-499 vinyl acrylic emulsion (Reichhold Chemicals, Inc.) and 800 grams of gypsum filler, as in Example 1, were then mixed into the resin system. 100 grams of glass fibers, as in Example 1, were then added and mixed in and the resulting compound heat hardened at about 300° F. for about 4 hours.

EXAMPLE 36

600 grams of UF resin were mixed with 20 grams of a hardening agent (Reichhold Chemicals, Inc. CA6-26) and 800 grams of gypsum filler, as in Example 1, were then mixed into the resin system. 24 grams of chopped glass fibers, as in Example 1, between about ½" and about ¾" in length were then added and mixed in and the resulting compound diluted with 7 oz. of water at about 140° F. 10 grams of a de-airing agent (water based organic emulsion-Southeastern Adhesive Corporation) was added. The coupound was then molded and hardened at room temperature for about 4 hours in the mold and then for about 8 additional hours outside of the mold.

EXAMPLE 37

800 grams of UF resin (Borden Chemicals, Inc.) were mixed with 200 grams of 40-350 Plyamul resin (Reichhold Chemicals, Inc.) and 20 grams of a hardening agent (Reichhold Chemicals, Inc. CA6-17). 800 grams of gypsum filler, as in Example 1, were then mixed into the resin system. 40 grams of finely chopped glass fibers, as in Example 1, were added and mixed in. The resulting compound was diluted with 7 oz. hot water, and 6 grams of a water-based organic de-airing agent (Southeastern Adhesive Corp.) was added and mixed in to eliminate bubbles and provide a smooth surface finish. The compound was hardened at room temperature.

What is claimed is:

1. A durable molded article of a hardened mixture comprising
   a resin system comprising at least one hardenable resin,
   gypsum filler which is a by-product of phosphate refining and which includes gypsum, water, and phosphate, and
   glass fibers which are a by-product of bulk filter media manufacturing.
2. The article of claim 1 wherein
   said resin system comprises between about 25% and about 90%, by weight, of said mixture,
   said gypsum filler comprises between about 3% and about 60%, by weight, of said mixture, and
   said glass fibers comprise between about 1% and about 15%, by weight, of said mixture.
3. The article of claim 1 wherein
   said gypsum filler comprises, by weight, between about 75% and about 95% gypsum, between about 0.2% and about 1% phosphate, and
   the majority of said glass fibers are between about ¼ inch and about 2 inches long.
4. The article of claim 1 wherein said resin system further comprises a hardening agent.
5. The article of claim 1 wherein said resin system comprises a heat hardenable resin.
6. The article of claim 1 wherein said resin system comprises urea formaldehyde resin.
7. The article of claim 1 wherein said resin system comprises, by weight, between about 20% and about 95% of a first hardenable resin and between about 5% and about 80% of at least a second hardenable resin.
8. The article of claim 7 wherein said resin system further comprises a hardening agent.
9. The article of claim 7 wherein said first hardenable resin is urea formaldehyde resin.
10. The article of claim 7 wherein said second hardenable resin is acrylic emulsion, polyvinyl acetate resin, vinyl acrylic copolymer, polyester resin, phenolic resin, or styrene butadiene latex.
11. The article of claim 7 wherein said second hardenable resin is polyvinyl acetate resin.
12. The article of claim 1 further comprises a coloring agent.
13. A process of preparing a molded article comprising the steps of
    preparing a resin system,
    mixing gypsum filler, which is a by-product of phosphate refining and which includes gypsum, water, and phosphate, into said resin system to form a gypsum-resin mixture,
    mixing glass fibers, which are a by-product of bulk filter media manufacturing, into said gypsum-resin mixture to form a molding compound,
    pouring said molding compound into a mold, and
    hardening said molding compound.
14. The process of claim 13 wherein
    said resin system comprises between about 25% and about 90%, by weight, of said molding compound, said gypsum filler comprises between about 3% and about 60%, by weight, of said molding compound, and said glass fibers comprise between about 1% and about 15%, by weight, of said molding compound.

15. The process of claim 13 wherein said gypsum comprises, by weight, between about 75% and about 95% gypsum, between about 10% and about 20% water, and between about 0.2% and about 1% phosphate, and the majority of said glass fibers are between about ¼ inch and about 2 inches long.

16. The process of claim 13 wherein said resin system further comprises a hardening agent.

17. The process of claim 13 wherein said resin system comprises a heat hardenable resin.

18. The process of claim 13 wherein said resin system comprises urea formaldehyde resin.

19. The process of claim 13 wherein said resin system comprises, by weight, between about 20% and about 95% of a first hardenable resin and between about 5% and about 80% of at least a second hardenable resin.

20. The process of claim 19 wherein said resin system further comprises a hardening agent.

21. The process of claim 19 wherein said first hardenable resin is urea formaldehyde resin.

22. The process of claim 19 wherein said second hardenable resin is acrylic emulsion, polyvinyl acetate resin, vinyl acrylic copolymer, polyester resin, phenolic resin, or styrene butadiene latex.

23. The process of claim 19 wherein said second hardenable resin is polyvinyl acetate resin.

24. The process of claim 13 in which the hardening step comprises heating said molding compound to a temperature of between about 240° F. and about 350° F. for between about 3 hours and about 5 hours.

25. The process of claim 13 which includes, following said step of forming said molding compound, the step of mixing a coloring agent with said molding compound.

26. The process of claim 13, further including, following said step of forming said molding compound, the step of diluting said molding compound with water.

27. The process of claim 13 which includes, following the step of preparing said resin system, the step of mixing a coloring agent into said gypsum filler.

28. The process of claim 13 which includes, before the step of pouring said molding compound into said mold, the steps of coating the mold surface with a mixture of a polyester resin and a hardening agent, and hardening said coating.

* * * * *